United States Patent [19]

Stava

[11] Patent Number: 4,861,965
[45] Date of Patent: Aug. 29, 1989

[54] METHOD AND APPARATUS FOR TIG WELDING

[75] Inventor: Elliott K. Stava, Brecksville, Ohio

[73] Assignee: Lincoln Electric Company, Cleveland, Ohio

[21] Appl. No.: 138,854

[22] Filed: Dec. 29, 1987

[51] Int. Cl.$^4$ .............................................. B23K 9/09
[52] U.S. Cl. .......................... 219/130.51; 219/137 PS
[58] Field of Search ..................... 219/130.51, 137 PS, 219/130.5

[56] References Cited

U.S. PATENT DOCUMENTS

| | | | |
|---|---|---|---|
| 3,382,345 | 5/1968 | Normando | 219/137 PS |
| 3,728,515 | 4/1973 | Gedgaudas | 219/130.51 |
| 4,742,208 | 5/1988 | Overman | 219/137 PS |

FOREIGN PATENT DOCUMENTS 58-132368  1/1982  Japan ............................. 219/130.51

Primary Examiner—Clifford C. Shaw

[57] ABSTRACT

A method and apparatus for TIG welding by passing an alternating current between a non-consumable electrode and a workpiece to form an arc, which apparatus comprises a single reactor, passing a direct current from a direct current power supply through a first portion of the reactor and in a negative direction from the workpiece to the electrode for creating a heating cycle, switchably disconnecting the direct current power supply from the circuit and immediately connecting the second portion of the reactor in a positive direction across the electrode and workpiece for creating a short cleaning cycle for cleaning the workpiece preparatory to the next heating cycle. These cycles are continued to create a TIG welding process.

18 Claims, 3 Drawing Sheets (1st) Q1 ON, Q2 OFF ⟶ E = −, W = +, I = −(WELD)
(2nd) Q1 OFF, Q2 ON ---⟶ E = +, W = −, I = +(CLEAN)

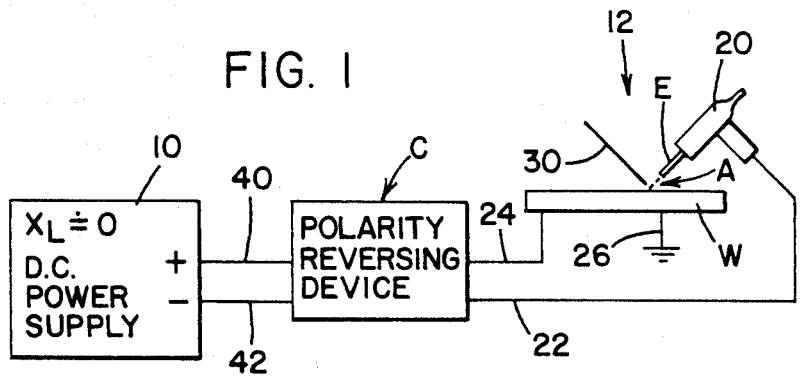
FIG. 1
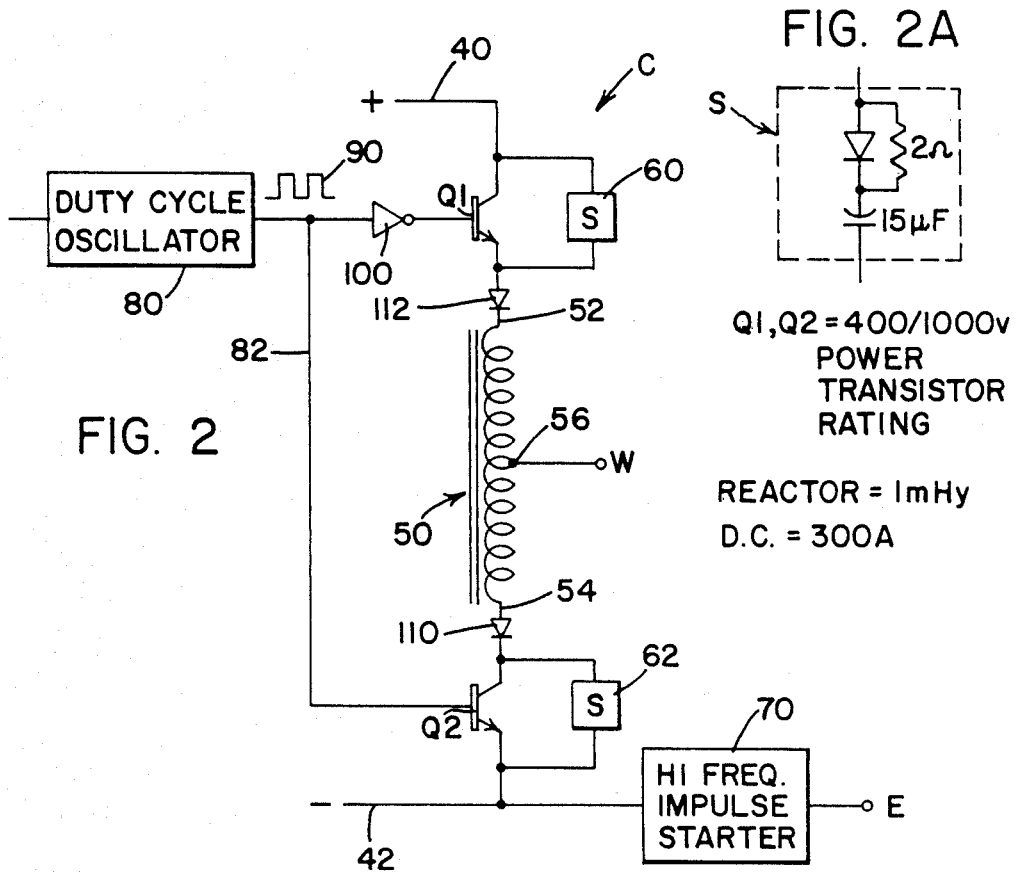
FIG. 2
FIG. 2A
Q1, Q2 = 400/1000v POWER TRANSISTOR RATING
REACTOR = 1 mHy
D.C. = 300A (1st) Q1 ON, Q2 OFF ⟶ E=−, W=+, I=−(WELD)
(2nd) Q1 OFF, Q2 ON ---> E=+, W=−, I=+(CLEAN)

METHOD AND APPARATUS FOR TIG WELDING

The present invention relates to the art of arc welding and more particularly to a method and apparatus, especially adapted for TIG welding metals, such as aluminum.

The invention is particularly applicable to the art of TIG welding aluminum and it will be described with particular reference thereto; however, it is appreciated that the invention has much broader applications and may be used in various arc welding processes employing both a consumable or non-consumable electrode, wherein it is desirable to periodically reverse the polarity of the current flow in the arc between the electrode and the workpiece with a direct current power supply.

In welding aluminum, and similar metals, it has become somewhat common practice to use TIG welding wherein a non-consumable electrode, such as a tungsten electrode, is spaced from the workpiece a distance sufficient to establish an arc when current flow is created by a voltage across the spacing. Since aluminum oxidizes quite easily, it is necessary to remove aluminum oxide from the welding surface as filler wire is melted by the heat of the arc and deposited onto the aluminum workpiece. It has become somewhat common practice to clean the metal by using an alternating current power supply for directing an alternating current through the gap or spacing between the electrode and workpiece. In accordance with this practice, during the positive cycle, the electrode is positive with respect to the workpiece; therefore, electrons are emitted from the workpiece. This process disintegrates and removes aluminum oxide from the surface preparatory to the immediately following negative cycle wherein the tungsten or other non-consumable electrode is negative with respect to the workpiece. Electrons are emitted from the tungsten electrode in the direction of the workpiece for the purpose of relatively efficient heating in the arc area. By employing alternating current through the arc, alternate primarily cleaning cycles and heating cycles are created to provide a fairly efficient TIG welding procedure for aluminum. Even though this welding process is successful and widely used substantial practical and procedural disadvantages have been experienced. For instance, it is not an optimally efficient procedure to employ positive cleaning cycles having durations substantially the same as the duration of the negative polarity heating cycles. The difference in emissivity of the electrode and the workpiece distort the alternating current cycle thus producing a relatively small positive cycle between negative polarity heating half cycles. This unbalanced output current is typical for saturable reactor type AC power sources which are being used for alternating current TIG welding of aluminum. In addition to the above disadvantages, TIG welding of aluminum is not easily performed with existing equipment used for manual, self shielded flux cored and gas metal arc welding. Most industrial arc welding power supplies in the field are direct current. Converting these welders to alternating current so that TIG welding can be performed is a costly and impractical procedure for most owners of direct current power supplies.

When direct current power supplies are used for TIG welding, the operator must select the polarity to be used. If mild steel or stainless steel is to be welded, it need not be cleaned therefore, direct current electrode negative TIG welding can be used. This polarity provides no arc cleaning action to remove oxide film; therefore, if used for welding aluminum, preweld cleaning and oxide removal of the welding surface must be accomplished before welding. This is practical only when heavy aluminum plate is TIG welded and the additional precleaning requirement is outweighed by the increased welding speed using electrode negative polarity. In view of this, the operator often selects direct current electrode positive TIG welding wherein the current flows from the electrode to the workpiece. This causes a cleaning action in combination with the arc welding procedure however, it also results in a very slow rate of welding. Even though this concept is technically acceptable, the tungsten electrode becomes extremely hot unless its dimension is drastically increased and water cooling is used. For that reason, using direct current electrode positive to produce a cleaning effect also demands the implementation of a special TIG welding torch. This is expensive, more difficult to control and is generally not acceptable in the field.

In summary, when TIG welding, especially TIG welding of aluminum, a special alternating current power supply must be provided or an operator must employ direct current power supplies with a selected polarity which is not economical, convenient nor the optimum operating procedure.

These and other disadvantages of the present technology involving TIG welding, have been overcome by the present invention which allows use of a direct current power supply to produce the advantage of an alternating current welder.

THE INVENTION

The present invention relates to a device, or a circuit, which can be connected onto a standard direct current power supply for providing a TIG welder having the advantages of alternating current TIG welders.

In accordance with the present invention, there is provided a method and apparatus for TIG welding using a direct current power supply, which method and apparatus employ a high reactance reactor, or choke, having first and second portions. The direct current power supply is connected across the electrode and workpiece and through the first portion of the reactor. This produces a negative polarity direction for current flow to produce a preselected heating cycle, during which energy is stored in the reactor. The second portion of the reactor is then placed across the electrode and workpiece in the positive direction for a preselected cleaning cycle. The reversal of current is repeated to produce a welding current alternating between a positive cleaning cycle and negative heating cycle. This current alternation is accomplished by high speed power switches with one switch being conductive when another switch is non-conductive, and vice versa. By such a switching scheme, the direct current power supply is connected across the electrode and workpiece in the negative polarity direction for efficient heating. The stored energy is then switched across the workpiece and the electrode in the opposite polarity direction to produce the aforementioned cleaning procedure. By merely changing the duration when one switch is on and the other switch is off, and vice versa, the heating cycle can be varied with respect to the cleaning cycle to adjust the amount of cleaning. Consequently, only the cleaning needed to produce a quality weld is employed. In the past, alternating current TIG welders often had a less accurate arrangement for controlling the energy employed for cleaning than with the present invention. Each of these two cycles is accomplished in an efficient manner without requiring substantial equipment, technology or modification of an existing direct current power supply available to many low volume welders.

By using the relatively inexpensive circuit, or device of the present invention, any normal direct current welder can be converted to a TIG welder having sufficient capabilities to weld aluminum effectively. This relatively simple accessory for converting a direct current power supply to an alternating current TIG welder at a low cost overcomes the disadvantages associated with alternating current welders, wave shaping converters, and use of direct current for TIG welding.

The primary object of the present invention is the provision of a device which can be adapted to a direct current power supply for converting that power supply into an alternating current TIG welder in the field.

A further object of the present invention is the provision of a device, as defined above, which device overcomes certain disadvantages associated with standard alternating current TIG welders of the type now commonly used for welding aluminum.

Another object of the present invention is the provision of a device, as defined above, which device can weld metal with different cleaning requirements by merely adjusting the duty cycle to provide the proper cleaning energy during cleaning cycles between negative polarity heating cycles.

Yet another object of the present invention is the provision of a device, as defined above, which device converts the direct current output of a standard power supply into an alternating current TIG welder having the capabilities to adjust the duty cycle between cleaning and heating polarities by merely modifying the duty cycle of a standard oscillator.

Another object of the present invention is the provision of a method of operating the device, as defined above, which method employs the concept of a high reactance reactor or choke with first and second portions, connecting the first portion of the reactor across the power supply in a negative polarity direction for a heating cycle and then reversing the procedure by applying the second portion of the reactor across the workpiece in the opposite direction for the purposes of creating an intermediate cleaning cycle similar to the cleaning procedure obtained by standard alternating current TIG welding.

These and other objects and advantages will become apparent from the following description taken together with the accompanying drawings in which:

BRIEF DESCRIPTION OF DRAWINGS

FIG. 1 is a schematic diagram showing the application of the present invention to an existing direct current power supply for TIG welding of aluminum;

FIG. 2 is a wiring diagram illustrating the preferred embodiment of the present invention;

FIG. 2A is a partial wiring diagram showing details of the snubber S of FIG. 2;

PREFERRED EMBODIMENT

Figure 3:
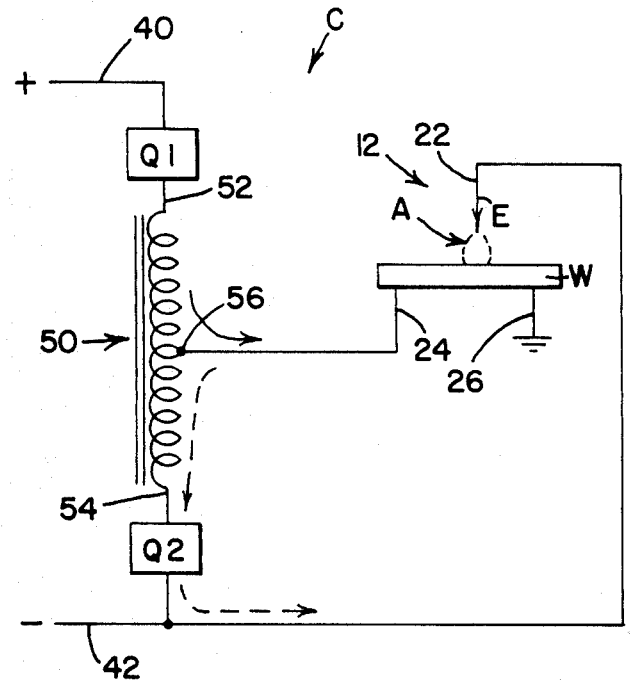
FIG. 3 is a simplified circuit diagram of the preferred embodiment illustrated in FIG. 2 showing operating characteristics of the present invention, together with certain switching characteristics employed in the operation of the preferred embodiment.

Referring now to the drawings wherein the showings are for the purpose of illustrating a preferred embodiment of the invention only, and not for the purpose of limiting same, FIG. 1 shows a standard direct current power supply 10 used by many operators to weld a variety of workpieces under many ambient conditions. The present invention is primarily adapted to convert this direct current power supply into a TIG welder of the type operating a TIG welding station 12 having schematically illustrated torch 20 with tungsten electrode E, extending toward the workpiece W, ground at 26. The workpiece is aluminum onto which aluminum from filler wire 30 is fed. Heat from arc A created between electrode E and workpiece W melts wire 30 and deposits the wire onto the workpiece. In accordance with the present invention a converter, device or circuit C is adapted to be connected onto positive output 40 and negative output 42 of direct current power supply 10 and to workpiece W and electrode E by means of leads 24 and 22 respectively. This power supply has no output inductance.

Referring now to FIG. 2, device or circuit C includes a high reactance reactor or choke 50 having output ends 52, 54 and a tap 56. Opposite ends of the reactor are connected to output leads 40, 42 by like-polarized, power transistor switches Q1, Q2 having standard parallel snubber circuits 60, 62 and current blocking diodes 110, 112. A standard starting circuit 70 is provided whereby high frequency current can be applied between electrode E and workpiece W for the purpose of initiating an arc to start the TIG welding process. When switch Q1 is closed and switch Q2 is opened, current flows along the solid line arrow from the positive terminal or output 40 to the negative terminal or output 42 of direct current. This negative current creates an extremely high heating to the workpiece as is accomplished in direct current electrode negative TIG welding. This current flow occurs in a circuit including the upper portion of reactor 50 between center tap 56 and upper end 52. In accordance with the invention, after a preselected heating cycle has terminated, power transistor Q1 is shifted to the non-conducting condition. At the same time, power transistor Q2 is rendered conductive. The energy stored in reactor 50 in the lower portion between center tap 56 and end 54 is then allowed to flow through the TIG welding station 12 in the positive direction as indicated by the dashed arrows in FIG. 3. In this manner, current flow is from the electrode E to the workpiece W through arc A. This is essentially the same as direct current electrode positive TIG welding with the electrons emitted from the workpiece impinging upon the tungsten electrode. This provides a positive polarity cleaning cycle to remove deleterious materials from the workpiece in the area to be welded. This cleaning cycle, or positive direction current, has a relatively short duration compared to the negative direction or negative polarity so that efficient cleaning takes place without deteriorating the electrode or reduction in the efficiency of the heating procedure.

A variety of arrangements could be provided to control the switching function to accomplish the reverse polarity control over current flow in reactor or choke 50; however, in accordance with the preferred embodiment of the invention as shown in FIG. 2, a duty cycle oscillator 80 has an output 82 and creates a series of pulses 90, the width of which determines when power transistor Q1 is non-conductive. Positive pulses 90 are directed to the base of transistor Q1 through inverter 100 and directly to the base of transistor Q2. These two power transistors are, thus, mutually toggled between a first condition with transistor Q1 conducting and transistor Q2 non-conducting and a second condition with the power transistor Q2 conducting and power transistor Q1 non-conducting. These transistors are the standard, high power, rapid switching transistors, such as Darlington connected power transistors and includes a snubber S such as schematically illustrated in FIG. 2A. Details of the components in the preferred embodiment are set forth at the right of FIG. 2.

Figure 4:
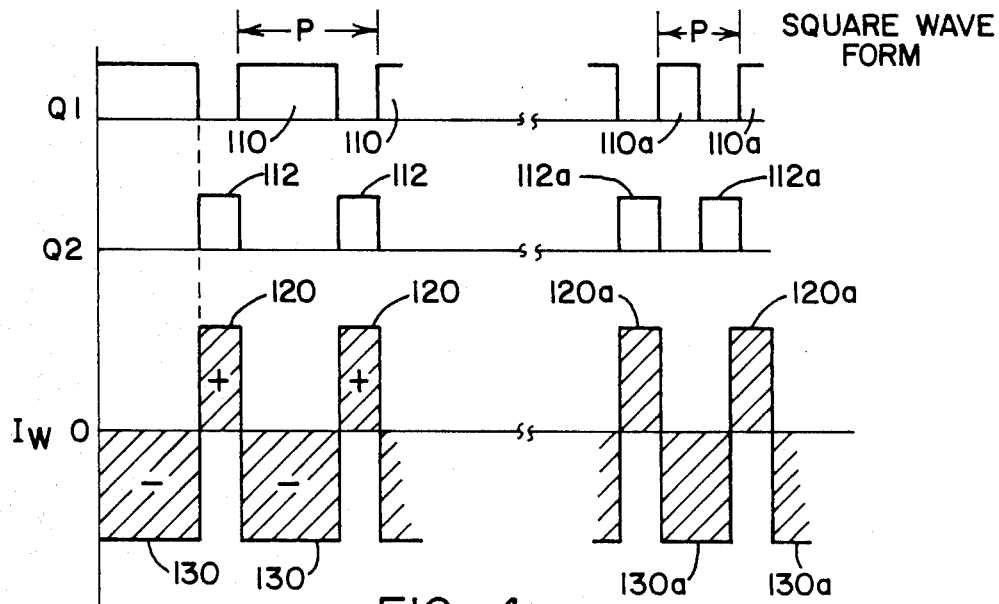
FIG. 4 is a graph illustrating the switching characteristics and current pulses obtained in operation of the preferred embodiment of the present invention; and, FIG. 5 is a schematic view illustrating the use of the present invention with a consumable electrode or MIG arc welding process.

The operating characteristics of the present invention are described in connection with FIGS. 1–3; however, the cycles are schematically illustrated as pulses in FIG. 4. The upper pulse chart represents the conductive condition of power transistor Q1. When this transistor is conducting, pulse 110 is present. When pulse 110 is not present, a pulse 112, indicating the conductive condition of power transistor Q2, is in existence, as shown in the next lower graph. Welding current $I_W$ through arc A is illustrated in the bottom graph of FIG. 4. Pulses 90 generally corresponds with pulses 112 shown in FIG. 4. The negative polarity cycles of welding current is $I_W$ illustrated as heating cycles 130. The positive polarity cleaning cycles 120 separate the heating cycles and have a duration corresponding to the duration of pulses 90. By changing oscillator 80 the duty cycle during period P can be modified by changing the width of pulses 90. This concept is illustrated in the right hand portion of FIG. 4 wherein each of the various pulses is a modified version of the same pulses in the left hand portion of the figure with the designation a.

Figure 5:
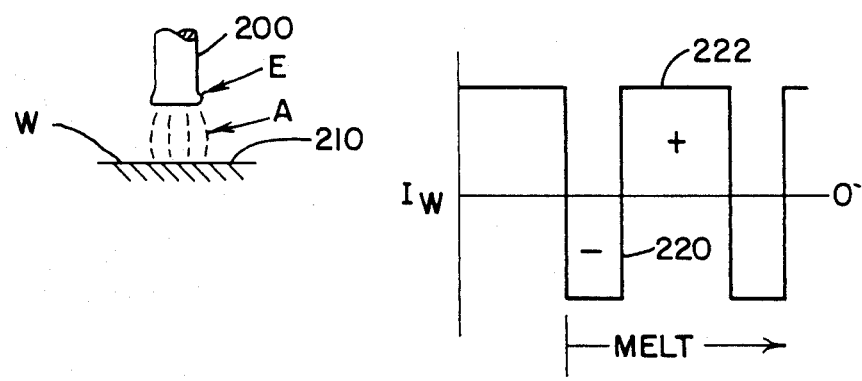

As previously explained, the present invention is primarily directed to the concept of TIG welding and to the ability to convert a somewhat standard, easily obtainable direct current power supply, or welder, to an alternating current type TIG welder. In some instances, this same concept may be applicable to consumable electrode welding, as suggested in schematic showing of FIG. 5. Consumable electrode 200 is melted and deposited upon workpiece 210 by globular transfer, short circuiting transfer, pulse current transfer, etc. In any of these systems of metal transfer, it may be advantageous to shift from a positive current to a negative current for purposes of increasing the electrode meltoff rate or for other reasons. The present invention can be employed for providing a momentary current polarity reversal for use in welding, as well as for TIG welding; however, TIG welding is the basic aspect of the present invention. The right hand portion of FIG. 5 indicates the ability of the welding current to be negative polarity or positive polarity by control of the reactor 50 in accordance with the present invention. In this instance, a melting cycle can be accomplished by an arc driven in either a positive or negative direction as shown by pulses 222, 220, respectively.

The energy stored in the reactor is dissipated in the arc when the switching means or procedure is in the cleaning cycle or mode. The flux in the reactor is always attempting to flow in the same direction to provide the available current for the rapid, short cleaning pulses inbetween the sustained heating pulses. The reactance of the reactor, or choke has a value which is sized to obtain the results set forth in this application. The rate of current change through the arc A is quite rapid in view of the high reactance of the choke. This produces a spike at the zero crossing point to sustain the arc when there is a reversal of polarity, which occurs during each switching operation.

The circuit C has all the advantages of a normal alternating current, TIG welder with the additional capacity to adjust the relative amount of heating and cleaning of the workpiece for a given period P. This circuit causes the electrode polarity of a direct current power source 10 to alternate, which is a concept not heretofore used in TIG welding. In accordance with the preferred embodiment, power transistor Q1 is conductive for most of the period P. The remaining portion of the current flow occurs during the second condition wherein power transistor Q2 is conducting. During this cleaning cycle, arc energy is provided from the stored energy in the reactor. The transistors are positive switching devices; therefore, the energy in the choke is retained in the choke without a freewheeling current flow. In this manner, high voltage spikes occur across arc A during the zero crossing between polarity reversals to establish the arc A. The duty cycle oscillator can control the ratio of positive and negative power to control the extent of the cleaning action created during the positive current flow.

Another application of this current reversal circuit would be in the reduction of arc blow. This distortion of the arc which is caused by magnetic field interaction with the arc plasma, is normally associated with welding consumable electrodes at high DC current levels. This invention will reduce the effects of all blow by momentarily reversing the arc current.

Having thus defined the invention, the following is claimed:

1. A device, driven by a direct current power supply having a positive output and negative output, for causing an alternating current to flow between the workpiece member and electrode member in an arc welding system, said device comprising: an inductive reactor having a tap, first and second opposite ends and a common core, means for connecting said tap to one of said members, means for connecting the other of said members to one of said power supply outputs, a first power switch, means for connecting said first power switch between the first end of said reactor and one of said power supply outputs having a first polarity, a second power switch, means for connecting said second power switch between the second end of said reactor and the one of said power supply outputs having a second polarity, said switches each having a conductive state allowing flow of current through said reactor in a like direction from said positive output to said negative output, and a control means for said first and second switches, said control means including signal means for shifting between a first condition providing energy from said power supply to said reactor with said first switch in its conductive state and said second switch in its non-conductive state to pass current through said reactor between said first end and said tap to magnetize said core and a second condition supplying energy by said reactor with said second switch in its conductive state and said first switch in its non-conductive state to cause current flow through said reactor between said tap and said second end of said reactor as said core is demagnetized.

2. A device as defined in claim 1 wherein said first condition has a first duration and said second condition has a second duration and said signal means includes timing means for changing at least one of said first and second durations.

3. A device as defined in claim 2 wherein said timing means includes means for maintaining the sum of said first and second durations generally equal.

4. A device as defined in claim 3 wherein said first polarity is positive.

5. A device as defined in claim 3 wherein said timing means is a duty cycle oscillator.

6. A device as defined in claim 5 wherein said device is adapted for use in a TIG welding system where said electrode member is a non-consumable electrode, said timing means includes means for selecting said first duration to be substantially greater than said second duration.

7. A device as defined in claim 3 wherein said device is adapted for use in a TIG welding system where said electrode member is a non-consumable electrode, said timing means includes means for selecting said first duration to be substantially greater than said second duration.

8. A device as defined in claim 2 wherein said first polarity is positive.

9. A device as defined in claim 2 wherein said timing means is a duty cycle oscillator.

10. A device as defined in claim 9 wherein said device is adapted for use in a TIG welding system where said electrode member is a non-consumable electrode, said timing means includes means for selecting said first duration to be substantially greater than said second duration.

11. A device as defined in claim 2 wherein said device is adapted for use in a TIG welding system where said electrode member is a non-consumable electrode, said timing means includes means for selecting said first duration to be substantially greater than said second duration.

12. A device as defined in claim 1 wherein said first polarity is positive.

13. A method of TIG arc welding by passing an alternating current between a non-consumable electrode member and a workpiece member in the form of an arc, said method comprising the steps of:
(a) connecting a D.C. power supply through a first switch and a first portion of a reactor and across said members with a polarity causing current flow in a given direction in said reactor and in a negative direction from the workpiece to said electrode while storing energy in a second portion of said reactor connected to said first portion by a common core;
(b) disconnecting said power supply from across said members while immediately connecting said second portion of said reactor in a positive polarity direction across said members for a given duration whereby current flows in a positive direction from said electrode member to said workpiece member during said duration by energy stored in said reactor and flowing in said given direction in said reactor; and,
(c) repeating steps (a) and (b) in sequence.

14. The method as defined in claim 13 including the step of adjusting the duty cycle between steps (a) and (b).

15. The method as defined in claim 13 including the step of adjusting said given duration.

16. An apparatus for TIG arc welding by passing an alternating current between a non-consumable electrode member and a workpiece member in the form of an arc, said apparatus comprising: first and second switches, a reactor, means for connecting a D.C. power supply through said first switch and a first portion of said reactor and across said members with a polarity causing current flow in a negative direction from the workpiece to said electrode while flowing in a given direction in said reactor to store energy in a second portion of said reactor; means for disconnecting said power supply from across said members while immediately connecting said second portion of said reactor in a positive polarity direction across said members whereby current flows in a positive direction from said electrode member to said workpiece member and in said given direction through said second portion of said reactor; and, means for shifting between said negative and positive polarity directions.

17. A method of TIG arc welding with a D.C. power supply, said method comprising the steps of:
(a) providing a high reactance reactor having first and second portions;
(b) connecting said power supply across said electrode and workpiece to cause current flow in a given direction through said first portion of said reactor and in a negative polarity direction for a preselected heating cycle;
(c) disconnecting said power supply from across said electrode and workpiece while immediately connecting the second portion of said reactor across said electrode and workpiece in a positive direction for a preselected cleaning cycle by stored energy in said second portion of said reactor causing current flow in said given direction through said second portion of said reactor; and,
(d) causing alternation between said heating cycle and said cleaning cycle.

18. A control circuit for converting a D.C. power supply having opposite polarity output terminals into an A.C. welding supply for directing welding current alternately between a first and second polarity through an arc gap between an electrode element and workpiece element, said control circuit comprising a common inductive reactor having a center tap dividing said reactor into means for connecting said center tap to one of said elements, first and second portions, first switch means for passing welding current through only said first portion of said reactor to said center tap in a given direction to cause current flow in a first polarity through said arc gap, whereby energy is stored in said reactor, second switch means for electrically connecting only said second portion of said reactor across said arc gap to cause current flow in a second polarity through said arc gap and in said given direction through said second portion of said reactor, and means for alternately actuating said first and second switch means at a preselected rate whereby current flows through said arc gap with its polarity alternating at said preselected rate.

* * * * *

UNITED STATES PATENT AND TRADEMARK OFFICE
CERTIFICATE OF CORRECTION

PATENT NO. : 4,861,965

DATED : August 29, 1989

INVENTOR(S) : Elliott K. Stava

It is certified that error appears in the above-identified patent and that said Letters Patent is hereby corrected as shown below:

Column 3, line 13, "waye" should read --- wave ---. Claim 18, line 8, after "into" insert --- first and second portions, ---; line 9, cancel "first and second portions,".

Signed and Sealed this

Twenty-fifth Day of February, 1992

Attest:

HARRY F. MANBECK, JR.

*Attesting Officer*  *Commissioner of Patents and Trademarks*